(12) United States Patent
Huang et al.

(10) Patent No.: US 8,293,163 B2
(45) Date of Patent: Oct. 23, 2012

(54) ELECTRICALLY DRIVEN INJECTION MOLDING SYSTEM WITH DUAL-DRIVING FUNCTION AND INJECTION MOLDING METHOD USING THE SYSTEM

(75) Inventors: Hanxiong Huang, Guangdong (CN); Baiyuan Lv, Guangdong (CN); Xiaolong Lv, Guangdong (CN)

(73) Assignee: South China University of Technology (SCUT), Guangdong (CN)

( * ) Notice: Subject to any disclaimer, the term of this patent is extended or adjusted under 35 U.S.C. 154(b) by 105 days.

(21) Appl. No.: 12/922,177

(22) PCT Filed: Mar. 13, 2009

(86) PCT No.: PCT/CN2009/070792
§ 371 (c)(1),
(2), (4) Date: Sep. 13, 2010

(87) PCT Pub. No.: WO2009/111992
PCT Pub. Date: Sep. 17, 2009

(65) Prior Publication Data
US 2011/0042853 A1 Feb. 24, 2011

(30) Foreign Application Priority Data
Mar. 13, 2008 (CN) .......................... 2008 1 0026771

(51) Int. Cl.
*B29C 45/07* (2006.01)
*B29C 45/48* (2006.01)
(52) U.S. Cl. ..................... 264/328.1; 425/542; 425/587; 425/589
(58) Field of Classification Search ............... 264/328.1; 425/157, 542, 547, 589, 593, 209, 587
See application file for complete search history.

(56) References Cited

U.S. PATENT DOCUMENTS

| | | | |
|---|---|---|---|
| 4,540,359 A | * | 9/1985 | Yamazaki ...................... 425/542 |
| 5,645,868 A | * | 7/1997 | Reinhart ........................ 425/145 |
| 2005/0147704 A1 | * | 7/2005 | Ickinger et al. ............... 425/145 |

FOREIGN PATENT DOCUMENTS

| | | | |
|---|---|---|---|
| DE | 259378 | * | 8/1988 |
| JP | 05-345337 | * | 12/1933 |

OTHER PUBLICATIONS

MWC Electromagnetic Multiple-Disk Clutch, Ogura Industial Corp., from http://www.ogura-clutch.com/products.html?category=2&product=72 on Mar. 28, 2012, two pages.*

* cited by examiner

*Primary Examiner* — Jill Heitbrink

(57) ABSTRACT

An electrically-driven injection molding system with a dual-driving function comprises an electric apparatus with a dual-driving function, a plasticizing unit, an injection unit, an injection carriage, a guide frame, and a base, wherein the electric apparatus with a dual-driving function is connected with the plasticizing unit and the injection unit, the guide frame is connected with the electric apparatus with a dual-driving function and the injection unit, and the electric apparatus with a dual-driving function, the plasticizing unit, the injection unit, the injection carriage, and the guide frame are installed on the integral base. An injection molding method is realized using the system. The system has an obviously simplified and compact structure, thus reducing the manufacturing cost, lowering the energy consumption, obviously extending the service life of the motors and ball screws, and making easy to popularize. The system provides some new ideas and innovation for developing next generation of the electrically-driven injection molding machines.

10 Claims, 5 Drawing Sheets

ELECTRICALLY DRIVEN INJECTION MOLDING SYSTEM WITH DUAL-DRIVING FUNCTION AND INJECTION MOLDING METHOD USING THE SYSTEM

BACKGROUND OF THE INVENTION

The invention relates to an injection molding machine used for processing the plastics, rubber, and other polymeric materials, in particular to an electrically-driven injection molding machine, and specifically to an electrically-driven injection molding system with a dual-driving function and an injection molding method realized using the system, in which both the plasticizing and injection units shares the same set of electrically-driven apparatus.

For a long time, the injection molding machines used for processing the polymers are generally driven by hydraulic systems, that is, the plasticizing unit, injection unit, clamping unit, and so on, are hydraulically driven. During recent years, the electrically-driven injection molding machines have been developed rapidly. Compared with the hydraulically-driven injection molding machines, the electrically-driven injection molding machines have some advantages, including higher control accuracy and response speed to the injection pressure and speed, lower energy consumption and noise. The plasticizing and injection units in the available electrically-driven injection molding machines are, however, generally driven by a set of separate electric transmission apparatus via synchronous belts (as shown in FIG. 1). The available electrically-driven injection molding machines have following shortcomings: (1) One set of electric transmission apparatus is used to drive the plasticizing unit via synchronous belts, the other set of electric transmission apparatus is used to drive the injection unit via synchronous belts, this results in a large and complex structure and increases the manufacturing cost; (2) The transmission accuracy is lower due to indirect transmission via the synchronous belts; (3) The frequent start and stop of the servo-motors result in their heating and so decrease their service life, whereas the frequent start and stop of the ball screws result in the impact force and so speed up their wear.

BRIEF SUMMARY OF THE INVENTION

An object of the invention is to overcome the aforementioned shortcomings of the available electrically-driven injection molding machines and to provide an electrically-driven injection molding system with a dual-driving function, in which both the plasticizing and injection units share the same set of electrically-driven apparatus.

Another object of the invention is to provide an electrically-driven injection molding method realized using the aforementioned system.

Said electrically-driven injection molding system with a dual-driving function comprises an electric apparatus with a dual-driving function, a plasticizing unit, an injection unit, an injection carriage, a guide frame, and a base, wherein the electric apparatus with a dual-driving function is connected with the plasticizing unit and the injection unit, the guide frame is connected with the electric apparatus with a dual-driving function and the injection unit, and the electric apparatus with a dual-driving function, the plasticizing unit, the injection unit, the injection carriage, and the guide frame are installed on the integral base.

Preferably, said electric apparatus with a dual-driving function includes a motor, a reduction box, an electromagnetic clutch for the plasticizing process, an electromagnetic clutch for the injection process, a spindle, a plasticizing screw bush, and a carrier rod. The input shaft in the reduction box is coupled to the motor. One end of the output shaft in the reduction box is connected with the fixed part of the electromagnetic clutch for the plasticizing; the running part of the electromagnetic clutch for the plasticizing is coupled to the plasticizing screw bush via a key. The other end of the output shaft in the reduction box is connected with the fixed part of the electromagnetic clutch for the injection, and the running part of the electromagnetic clutch for the injection is connected with one side of the ball screw nut in the injection unit.

Preferably, said plasticizing unit includes a plasticizing screw, a barrel, a nozzle, and a coupling flange. The coupling flange is installed on one side of a connecting plate, which is connected with the case of the reduction box in the electric apparatus with a dual-driving function. The shank of the plasticizing screw with a feather key is inserted into a plasticizing screw bush and can move axially within it, which is coupled to the running part of the electromagnetic clutch for the plasticizing. Under the combination of the energization and de-energization of the electromagnetic clutches for the plasticizing and injection, the plasticizing screw can rotate and retreat synchronously to plasticize the polymers and can advance to inject the molten polymer into the mold cavity, respectively.

Preferably, said injection unit includes a ball screw and its nut, a shaft sleeve, and a bearing seat. The ball screw nut is connected with the guide frame via the shaft sleeve and bearing seat, and the ball screw is inserted into the electromagnetic clutch for the injection through the ball screw nut. Under the energization or de-energization of the electromagnetic clutch for the injection, the ball screw can retreat without self-locking or advance to bring the plasticizing screw to inject the molten polymer.

Preferably, said guide frame is an enclosed structure that is comprised of a left frame, a right frame, a front guide pillar, and a back guide pillar. The reduction box in the electric apparatus with a dual-driving function and the injection unit are connected integrally by coupling sleeves and mounted on the front and back guide pillars in the guide frame so as to make the electric apparatus with a dual-driving function move back and forth freely. In order to improve the stationarity of the movement, supporting seats of a linear rolling guide are installed at the front and back sides of the base of the reduction box in the electric apparatus with a dual-driving.

Preferably, said injection carriage is mounted on the left frame of the guide frame and the supporting seats of the linear rolling guide. The injection carriage includes a motor with a reduction box, a ball screw and its nut, a bearing housing, and a forcemeter. The end portion of the ball screw with a link key is inserted into the coupling sleeve in the bearing housing. The ball screw nut is mounted within a forcemeter case. A spring, which is contact with a force sensor, is put on the left end of the ball screw nut. A feather key is inserted in the groove on the outside surface of the ball screw nut, which makes it possible to produce a forward pressing force and avoid the rotation of the ball screw nut during its operation.

An injection molding method realized using the electrically-driven injection molding system with a dual-driving function includes the steps of: (1) starting the motor in the injection carriage, which drives the plasticizing unit to advance towards the mold and makes the nozzle contact the mold tightly; (2) starting the motor in the electric apparatus with a dual-driving function, which energizes the electromagnetic clutch for the plasticizing to drive the plasticizing screw to rotate and retreat synchronously, that is, the plasticizing process is performed; and (3) energizing the electromagnetic clutch for the injection, which drives the ball screw and thus the plasticizing screw in the injection unit to advance axially, that is, the injection process is performed, then the electromagnetic clutch for the injection de-energizes to finish the injection process.

Said step (1) can be described as follows. When the electric apparatus with a dual-driving function is at its initial position, the tip of the plasticizing screw in the plasticizing unit locates at the forefront within the barrel, the ball screw in the injection unit retreats to the limiting position on the right, and the carrier rod supports the shank of the plasticizing screw. Now the electromagnetic clutches for the plasticizing and injection are both de-energized. Start the motor in the injection carriage, driving the plasticizing unit to advance towards the mold and making the nozzle contact the mold tightly. Once the pressing force increases gradually to the predetermined tonnage, the motor in the injection carriage is stopped to finish the pressing process.

Said step (2) can be described as follows. At the end of the pressing process, start the motor in the electric apparatus with a dual-driving function to energize the electromagnetic clutch for the plasticizing. The spindle in the electric apparatus with a dual-driving function rotates to drive both fixed and running parts of the electromagnetic clutch for the plasticizing to rotate synchronously. This in turn drives the plasticizing screw bush and thus the plasticizing screw to rotate. As the plasticizing screw rotates, the polymers are conveyed forwards constantly and plasticized, and the polymer melt pressure at the front end within the barrel increases gradually, which drives the plasticizing screw to retreat synchronously. When the plasticizing screw retreats to the preset position, a signal is sent from the control device to finish the plasticizing process.

Said step (3) can be described as follows. At the end of the plasticizing process, the electromagnetic clutch for the plasticizing is de-energized, which stops the rotation and retreat of the plasticizing screw. Whereas the electromagnetic clutch for the injection is energized to drive the ball screw nut in the injection unit and the spindle in the electric apparatus with a dual-driving function to rotate synchronously. As a result, the ball screw in the injection unit advances axially to act on the shank of the plasticizing screw via the carrier rod. This makes the plasticizing screw advance axially to inject predetermined molten polymer into the mold cavity. Then the electromagnetic clutch for the injection is de-energized to finish the injection process. After a specific amount of time, the motor in the injection carriage rotates reversedly to make the injection carriage retreat to the preset position. Hereto, a plasticizing-injection cycle is completed, and the next cycle can be followed.

Compared with the available technologies, the electrically-driven injection molding system with a dual-driving function has the following advantages. (1) The same set of electric transmission apparatus is shared by both the plasticizing and injection units, instead of two sets of transmission apparatus used for the plasticizing and injection units in the available electrically- or hydraulically-driven injection molding machines; (2) direct transmission via the spindle is used and so a higher transmission accuracy can be obtained, instead of indirect transmission via synchronous belts used in the available electrically-driven injection molding machines. The invention overcomes the shortcomings of the available electrically-driven injection molding machines. Said system has an obviously simplified and compact structure, thus reducing the manufacturing cost, saving the material, lowering the energy consumption, improving the reliability and stability of the operation, obviously extending the service life of the motors and ball screws, increasing the accuracy of the molded parts, and making easy to popularize. In a word, said system does provide some new ideas and innovation for developing next generation of the electrically-driven injection molding machines.

DETAILED DESCRIPTION OF THE INVENTION

The invention will be described in more detail with the aid of the implementation and the accompanying drawings, but the mode for carrying out the invention is not limited to what described as follows.

Figure 1:
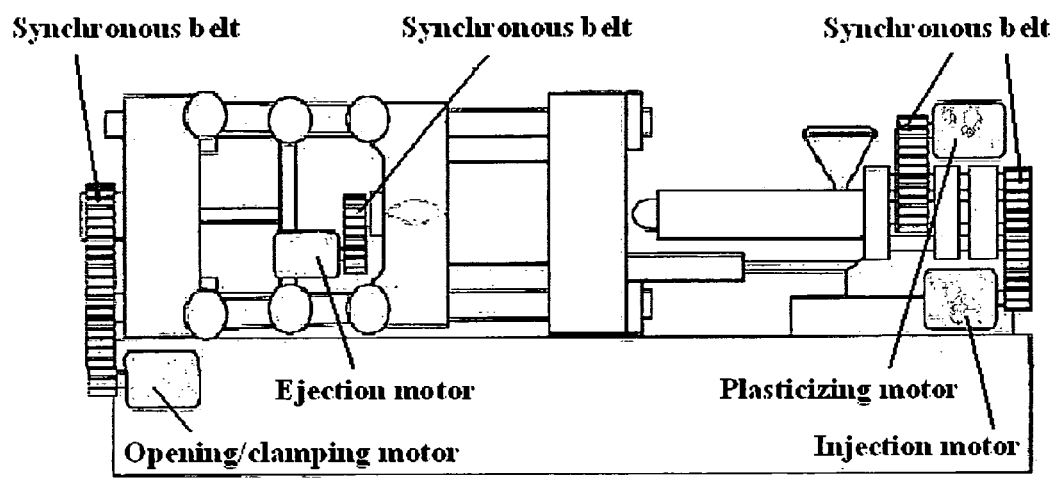
FIG. 1 is a schematic view of the available electrically-driven injection molding
Figure 2:
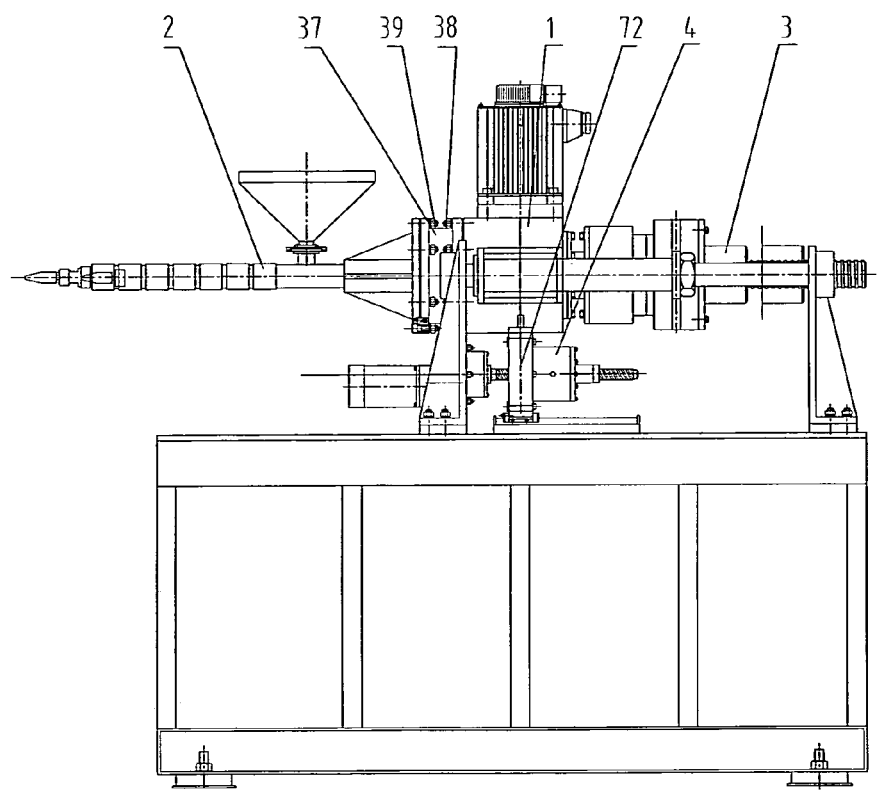
FIG. 2 is an overview of the electrically-driven injection molding system with a dual-driving function.
Figure 3:
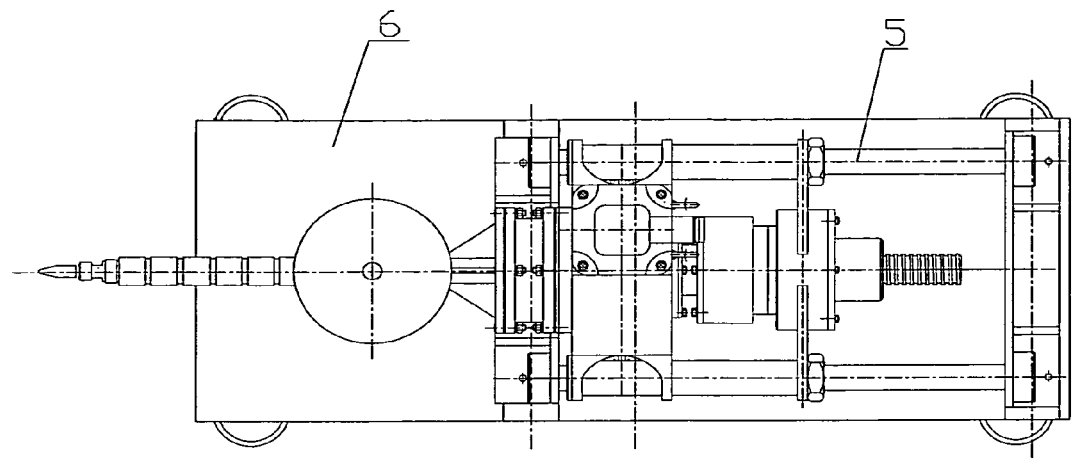
FIG. 3 is a top view of the electrically-driven injection molding system with a dual-driving function illustrated in FIG. 2.

FIGS. 2 and 3 show the construction of the electrically-driven injection molding system with a dual-driving function, which comprises an electric apparatus with a dual-driving function 1, a plasticizing unit 2, an injection unit 3, an injection carriage 4, a guide frame 5, and a base 6.

Figure 4:
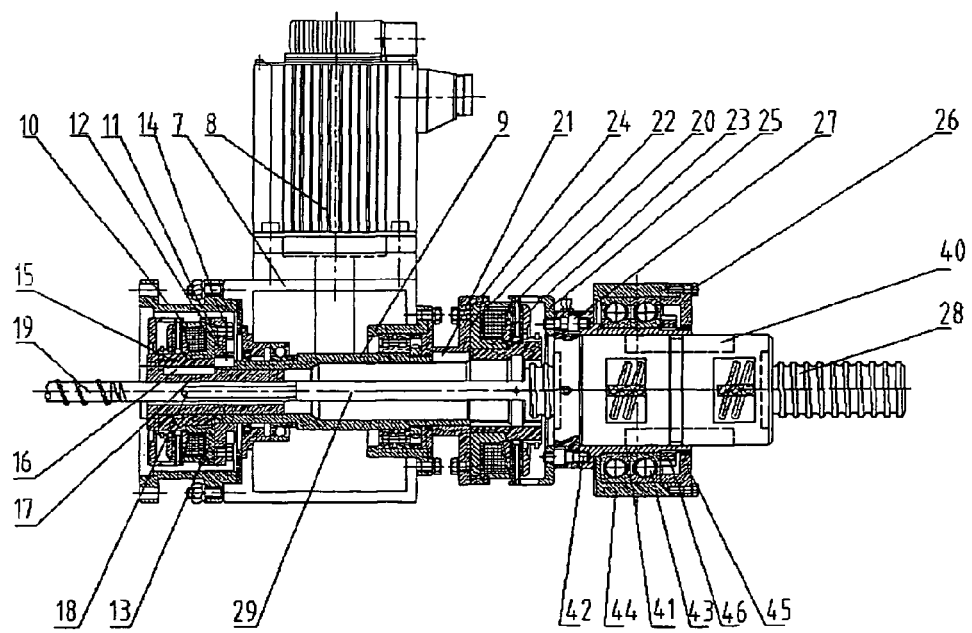
FIG. 4 is an overview of the electric apparatus with a dual-driving function in the system shown in FIG. 2.

As shown in FIG. 4, the electric apparatus with a dual-driving function 1 includes a wheel and worm reduction box 7, on which a motor 8 is installed. A hollow spindle 9 in the electric apparatus with a dual-driving function 1 is inserted into the reduction box 7. An electromagnetic clutch for the plasticizing process 10 is coupled to the left end of the spindle 9. The fixed part 13 of the electromagnetic clutch 10 is connected integrally with the left end of the spindle 9 via screws 14, a connecting plate 12, and a key 11, whereas the running part 15 of the electromagnetic clutch 10 is coupled to the plasticizing screw bush 17 via a key 16. The shank of the plasticizing screw 19 with a feather key 18 is inserted into the plasticizing screw bush 17. An electromagnetic clutch for the injection process 20 is coupled to the right end of the spindle 9. The electromagnetic clutch 20 is coupled to the connecting plate 22 via a key 21. The fixed part 23 of the electromagnetic clutch 20 is connected integrally with the right end of the spindle 9 via screws 24, whereas the running part 25 of the electromagnetic clutch 20 is connected with a ball screw nut 40 in the injection unit 3 via screws 27. A ball screw 28 in the injection unit 3 can freely pass through the center through-hole of the electromagnetic clutch 20 to reach the right end of the spindle 9. A carrier rod 29, which is used to support the shank of the plasticizing screw 19, is coupled to the left end of the ball screw 28.

Figure 5:
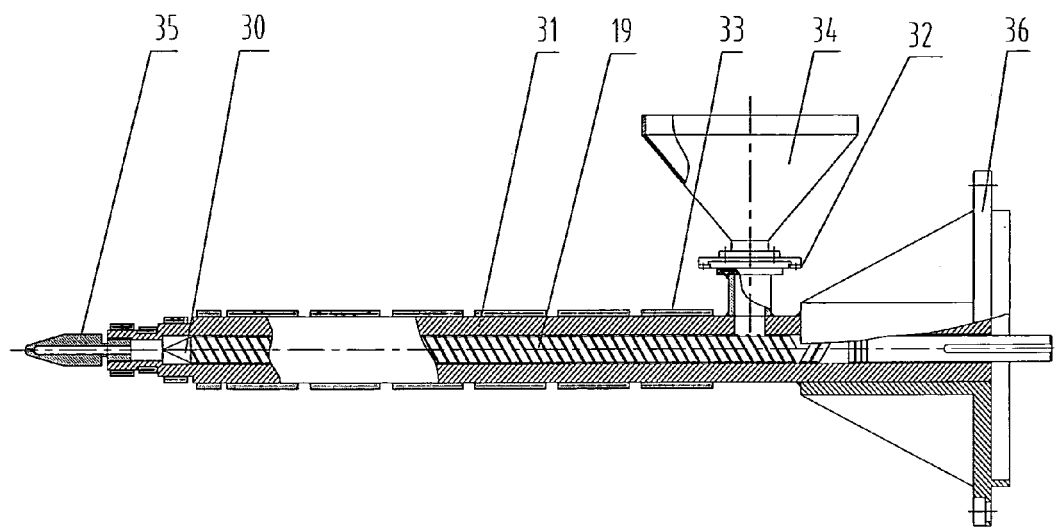
FIG. 5 is an overview of the plasticizing unit in the system shown in FIG. 2.

As shown in FIG. 5, the plasticizing unit 2 includes a plasticizing screw 19, a barrel 31, a heater 33, a hopper 34, a nozzle 35, and a coupling flange 36. The plasticizing unit 2 is connected integrally with the case of the reduction box 7 via the coupling flange 36 and a connecting plate 37 (as shown in FIG. 2) combined with screws 38 and 39.

As shown in FIG. 4, the injection unit 3 includes a ball screw 28 and its nut 40, which is connected with a shaft sleeve 41 via screws 42. A bearing 43, the outer race of which is positioned by a gland 45 and the inner race of which is positioned by a nut 46, is installed between the shaft sleeve 41 and the bearing seat 44.

Figure 6:
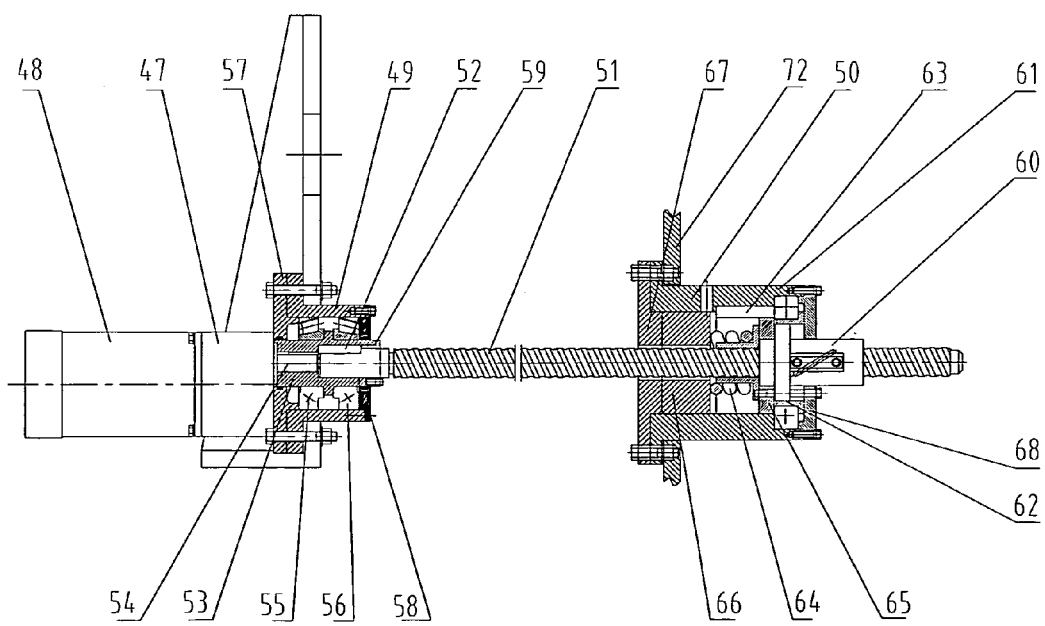
FIG. 6 is an overview of the injection carriage in the system shown in FIG. 2.

As shown in FIG. 6, the injection carriage 4 includes a motor 48 with a reduction box 47, a bearing housing 49, a forcemeter 50, and a ball screw 51. The end portion of the ball screw 51, on which a link key 52 is inserted, is coupled to the input shaft end 54 in the reduction box 47 via a coupling sleeve 53. Bearings 55 and 56, which are positioned by glands 57 and 58, respectively, are installed on the left and right sides of the coupling sleeve 53, respectively. An adapter sleeve 59 is installed on the right end of the coupling sleeve 53 so as to prevent the ball screw 51 from sliding out of the coupling sleeve 53. The nut 60 of the ball screw 51 is mounted within a forcemeter case 61. A guide groove 62 is cut on the outside surface of larger side of the ball screw nut 60. A feather key 63 is inserted in the guide groove 62 to match the forcemeter case 61. A spring 64 is put on the left end of the ball screw nut 60; a force sensor 66 is installed on the left end of the forcemeter case 61. The force sensor 66 contacts elastically with the ball screw nut 60 via the spring 64. Both ends of the forcemeter case 61 are pressed by glands 67 and 68, respectively.

Figure 7:
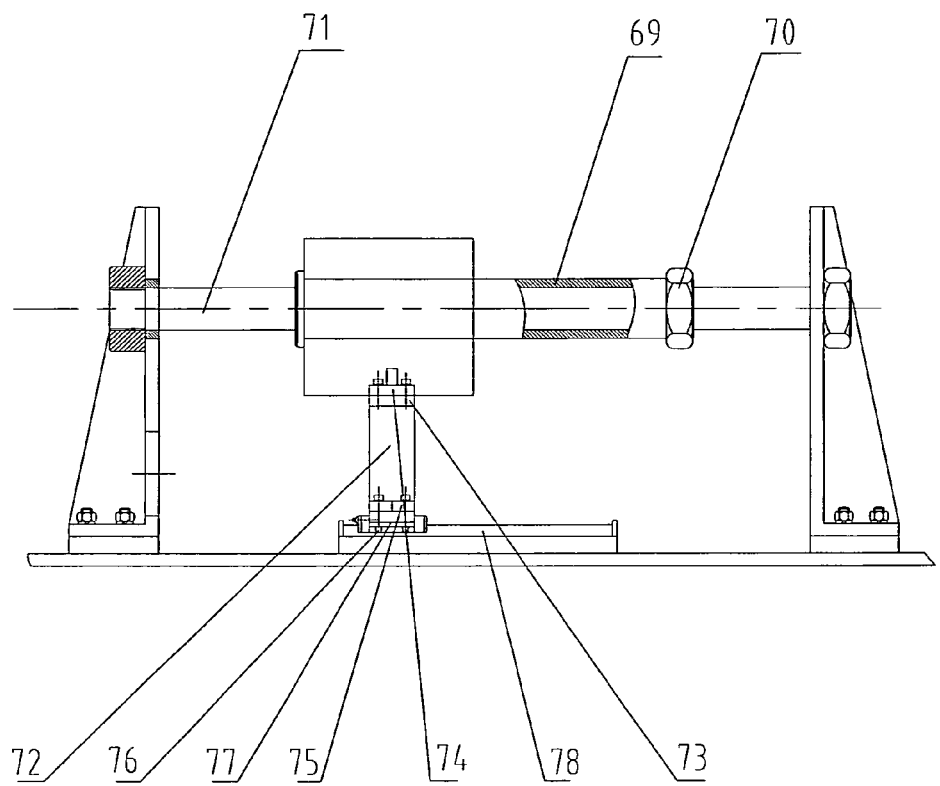
FIG. 7 is an overview of the guide frame in the system shown in FIG. 2.

Reference is now made to FIG. 7, the electric apparatus with a dual-driving function 1 is connected integrally with the injection unit 3 by coupling sleeves 69 combined with nuts 70. Moreover, the electric apparatus with a dual-driving function 1 and the injection unit 3 are connected integrally with the front and back guide pillars 71 in the guide frame 5 via the front and back housing bores in the reduction box 7 and the front and back housing bores of the supports in the injection unit 3, respectively. In order to improve the stationarity and reliability of the fore and aft movement of the electric apparatus with a dual-driving function 1 on the guide frame 5, the upper end 73 of a gusset plate 72 is connected with the base plate 74 of the reduction box 7 in the electric apparatus with a dual-driving function 1, whereas the bottom end 75 of the gusset plate 72 is connected with the slider 77 in a linear rolling guide 76.

The operation of the electrically-driven injection molding system with a dual-driving function is described as follows.

When the electric apparatus with a dual-driving function 1 is at its initial position, the tip 30 of the plasticizing screw 19 locates at the forefront within the barrel 31, the ball screw 28 in the injection unit 3 retreats to the limiting position on the right, and the carrier rod 29 supports the shank of the plasticizing screw 19. Now both the electromagnetic clutch for the plasticizing process 10 and the electromagnetic clutch for the injection process 20 are de-energized, the forcemeter 50 in the injection carriage 4 is at the limiting position on the right of the linear rolling guide 76. Start the motor 48 in the injection carriage 4, driving the ball screw 51. Under the constraint of the feather key 63, the ball screw nut 60 only moves axially, which drives the plasticizing unit 2 to advance towards the mold along the guide rail 78 via the gusset plate 72, with which the reduction box 7 and the linear rolling guide 76 are connected. At the moment when the nozzle 35 contacts with the mold tightly, the spring 64 within the forcemeter case 61 is compressed gradually under the advancement of the ball screw nut 60, and the resultant compressive force is transmitted to the force sensor 66. Once the pressing force increases gradually to the predetermined tonnage, a signal is sent from the force sensor 66 to stop the motor 48 in the injection carriage 4. Now the pressing process is finished. Subsequently, start the motor 8 in the electric apparatus with a dual-driving function 1, energizing the electromagnetic clutch for the plasticizing process 10, the running part 15 of which is actuated. At this moment, the spindle 9 rotates, which drives the fixed part 13 and the running part 15 of the electromagnetic clutch 10 to rotate synchronously. This in turn drives the plasticizing screw bush 17 and thus the plasticizing screw 19 to rotate. As the plasticizing screw 19 rotates, the polymers are conveyed forwards constantly and plasticized gradually, and the polymer melt pressure at the front end within the barrel 31 increases gradually, which drives the plasticizing screw 19 to retreat synchronously. Meanwhile the electromagnetic clutch for the injection process 20 is still de-energized, that is, the running part 25 of the electromagnetic clutch 20 is under its release condition, so the retreat of the ball screw 28 under the action of axial force of the plasticizing screw 19 makes the ball screw nut 40 and the running part 25 of the electromagnetic clutch 20 rotate synchronously. A back-pressure can be maintained during the retreat process of the ball screw 28 due to its pre-tightening force. When the plasticizing screw 19 retreats to the preset position, a signal is sent from the control device to finish the plasticizing process. At the same time, the electromagnetic clutch for the plasticizing process 10 is de-energized, which stops the rotation and retreat of the plasticizing screw 19. Whereas the electromagnetic clutch for the injection process 20 is energized, which actuates the running part 25 of the electromagnetic clutch 20 and in turn drives the ball screw nut 40 and the spindle 9 to rotate synchronously. As a result, the ball screw 28 advances axially to act on the shank of the plasticizing screw 19 via the carrier rod 29. This makes the plasticizing screw 19 advance axially to inject predetermined molten polymer into the mold cavity. Then the electromagnetic clutch for the injection process 20 is de-energized to finish the injection process. After a specific amount of time, the motor 48 in the injection carriage 4 rotates reversedly to make the injection carriage 4 retreat to the preset position. Hereto, a plasticizing-injection cycle is completed, and the next cycle can be followed.

What is claimed is:

1. An electrically-driven injection molding system with a dual-driving function, characterized in that it comprises an electric apparatus with a dual-driving function, a plasticizing unit, an injection unit, an injection carriage, a guide frame, and a base, wherein the electric apparatus with a dual-driving function is connected with the plasticizing unit and the injection unit, the guide frame is connected with the electric apparatus with a dual-driving function and the injection unit, and the electric apparatus with a dual-driving function, the plasticizing unit, the injection unit, the injection carriage, and the guide frame are installed on an integral base; and characterized in that, the plasticizing unit comprises a plasticizing screw;
the injection unit comprises a ball screw;
the electric apparatus with a dual-driving function includes
a motor running in a single direction continuously during plasticizing and injection molding processes;
a reduction box with an input shaft coupled to the motor and an output shaft being a spindle so that rotation of the spindle is driven by the motor;
a carrier rod which supports a shank of the plasticizing screw and is coupled to an end of the ball screw;
an electromagnetic clutch for plasticizing, which upon energization enables the plasticizing screw to be rotated by rotation of the spindle and synchronously driven to retreat by pressure of molten polymer at the plasticizing unit, thereby driving the carrier rod and the ball screw to retreat; and upon de-energization stops rotation and retreat of the plasticizing screw; and an electromagnetic clutch for injection, which upon energization enables the ball screw to advance by rotation of the spindle, thereby advancing the carrier rod and the plasticizing screw for injection.

2. The electrically-driven injection molding system with a dual-driving function according to claim 1, characterized in that said electric apparatus with a dual-driving function further includes a plasticizing screw bush; one end of the output shaft of the reduction box is connected with a fixed part of the electromagnetic clutch for the plasticizing; a running part of the electromagnetic clutch for the plasticizing is coupled to the plasticizing screw bush via a key; an other end of the output shaft of the reduction box is connected with a fixed part of the electromagnetic clutch for the injection, and a running part of the electromagnetic clutch for the injection is connected with one side of a ball screw nut in the injection unit.

3. The electrically-driven injection molding system with a dual-driving function according to claim 2, characterized in that said plasticizing unit further includes a barrel, a nozzle, and a coupling flange; the coupling flange is installed on one side of a connecting plate, which is connected with a case of the reduction box in the electric apparatus with a dual-driving function; the shank of the plasticizing screw with a feather key is inserted into the plasticizing screw bush and can move axially within it, which is coupled to the running part of the electromagnetic clutch for the plasticizing.

4. The electrically-driven injection molding system with a dual-driving function according to claim 2, characterized in that said injection unit further includes a shaft sleeve and a bearing seat; and the ball screw nut is connected with the guide frame via the shaft sleeve and bearing seat, and the ball screw is inserted into the electromagnetic clutch for the injection through the ball screw nut; under the energization or de-energization of the electromagnetic clutch for the injection, the ball screw can retreat without self-locking or advance to bring the plasticizing screw to inject the molten polymer.

5. The electrically-driven injection molding system with a dual-driving function according to claim 1, characterized in that said guide frame is an enclosed structure that is comprised of a left frame, a right frame, a front guide pillar, and a back guide pillar; the reduction box in the electric apparatus with a dual-driving function and the injection unit are connected integrally by coupling sleeves and mounted on the front and back guide pillars in the guide frame; supporting seats of a linear rolling guide are installed at front and back sides of a base of the reduction box in the electric apparatus with a dual-driving.

6. The electrically-driven injection molding system with a dual-driving function according to claim 1, characterized in that said injection carriage is mounted on a left frame of the guide frame and supporting seats of a linear rolling guide; the injection carriage includes a motor with a reduction box, a ball screw and its nut, a bearing housing, and a forcemeter; an end portion of the ball screw with a link key is inserted into a coupling sleeve in the bearing housing; the ball screw nut is mounted within a forcemeter case; a spring, which is in contact with a force sensor, is put on a left end of the ball screw nut; a feather key is inserted in a groove on an outside surface of the ball screw nut.

7. An injection molding method using the electrically-driven injection molding system with a dual-driving function as in claim 1, characterized in that it includes the steps of: (1) starting a motor in the injection carriage, which drives the plasticizing unit to advance towards a mold and makes a nozzle contact the mold tightly; (2) starting the motor in the electric apparatus with a dual-driving function and energizing the electromagnetic clutch for plasticizing to drive the plasticizing screw to rotate and retreat synchronously, that is, the plasticizing process is performed; and (3) de-energizing the electromagnetic clutch for plasticizing to stop rotating and retreating of the plasticizing screw and energizing the electromagnetic clutch for injection to drive the ball screw and thus the plasticizing screw in the injection unit to advance axially, that is, the injection process is performed, then the electromagnetic clutch for injection de-energizes to finish the injection process.

8. An injection molding method using the electrically-driven injection molding system with a dual-driving function according to claim 7, characterized in that said step (1) is described as follows: when the electric apparatus with a dual-driving function is at its initial position, a tip of the plasticizing screw in the plasticizing unit locates at forefront within a barrel, the ball screw in the injection unit retreats to a limiting position on the right, and the carrier rod supports the shank of the plasticizing screw; now the electromagnetic clutches for plasticizing and injection are both de-energized; start the motor in the injection carriage, driving the plasticizing unit to advance towards the mold and making the nozzle contact the mold tightly; once pressing force increases gradually to a predetermined tonnage, the motor in the injection carriage is stopped to finish the pressing process.

9. An injection molding method using the electrically-driven injection molding system with a dual-driving function according to claim 7, characterized in that said step (2) is described as follows: at the end of the pressing process, start the motor in the electric apparatus with a dual-driving function to energize the electromagnetic clutch for plasticizing; the spindle in the electric apparatus with a dual-driving function rotates to drive both the fixed and running parts of the electromagnetic clutch for plasticizing to rotate synchronously; this in turn drives the plasticizing screw bush and thus the plasticizing screw to rotate; as the plasticizing screw rotates, polymers are conveyed forwards constantly and plasticized, and polymer melt pressure at a front end within a barrel increases gradually, driving the plasticizing screw to retreat synchronously; when the plasticizing screw retreats to a preset position, a signal is sent from a control device to finish the plasticizing process.

10. An injection molding method using the electrically-driven injection molding system with a dual-driving function according to claim 7, characterized in that said step (3) is described as follows: at the end of the plasticizing process, the electromagnetic clutch for plasticizing is de-energized, which stops the rotation and retreat of the plasticizing screw; whereas the electromagnetic clutch for the injection is then energized to drive the ball screw nut in the injection unit and the spindle in the electric apparatus with a dual-driving function to rotate synchronously; as a result, the ball screw in the injection unit advances axially to act on the shank of the plasticizing screw via the carrier rod; this makes the plasticizing screw advance axially to inject predetermined molten polymer into a mold cavity; then the electromagnetic clutch for injection is de-energized to finish the injection process; after a specific amount of time, the motor in the injection carriage rotates reversedly to make the injection carriage retreat to a preset position; hereto, a plasticizing-injection cycle is completed, and the next cycle can be followed.

* * * * *